United States Patent [19]

Schindl et al.

[11] Patent Number: 4,711,537
[45] Date of Patent: Dec. 8, 1987

[54] STAGE FOR A MICROSCOPE

[75] Inventors: Klaus P. Schindl, Vienna; Franz Meitz, Bisamberg; Kurt Salzmann, Vienna, all of Austria

[73] Assignee: Reichert-Jung Optische Werke AG, Vienna, Austria

[21] Appl. No.: 873,360

[22] Filed: Jun. 12, 1986

[51] Int. Cl.$^4$ .................. G05G 11/00; G12B 9/00; G02B 21/26; G02B 21/32
[52] U.S. Cl. ............................. 350/531; 74/479; 248/1; 350/530
[58] Field of Search .................. 74/471 XY, 479; 108/137; 350/529, 530, 531; 248/13 D

[56] References Cited

U.S. PATENT DOCUMENTS

| 4,189,953 | 2/1980 | Volk | 350/531 |
| 4,262,991 | 4/1981 | Wagener et al. | 350/531 |
| 4,402,576 | 9/1983 | Stah et al. | 350/531 |
| 4,552,033 | 11/1985 | Märzhäuser | 350/531 |
| 4,557,568 | 12/1985 | Van Benschoten | 350/531 |

FOREIGN PATENT DOCUMENTS 0226091 8/1985 Fed. Rep. of Germany ...... 350/531

Primary Examiner—Bruce Y. Arnold
Assistant Examiner—Vincent J. Lemmo
Attorney, Agent, or Firm—Alan H. Spencer

[57] ABSTRACT

A stage for a microscope comprises a stage carrier, an object stage, an intermediate carrier disposed between the stage carrier and the object stage, and first and second displacement means. The first displacement means serves to displace the intermediate carrier together with the object stage in a first direction relative to the stage carrier, and the second displacement means serves to displace the object stage in a second direction substantially transverse to the first direction. The first and second displacement means are fixed relative to the stage carrier so that they do not move when the intermediate carrier and the object stage moves.

13 Claims, 8 Drawing Figures

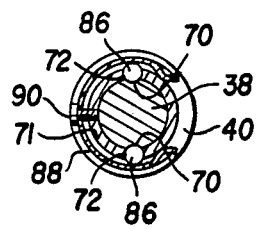
FIG. 5
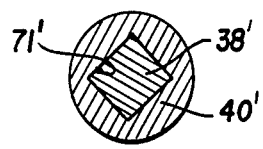
FIG. 6
FIG. 7
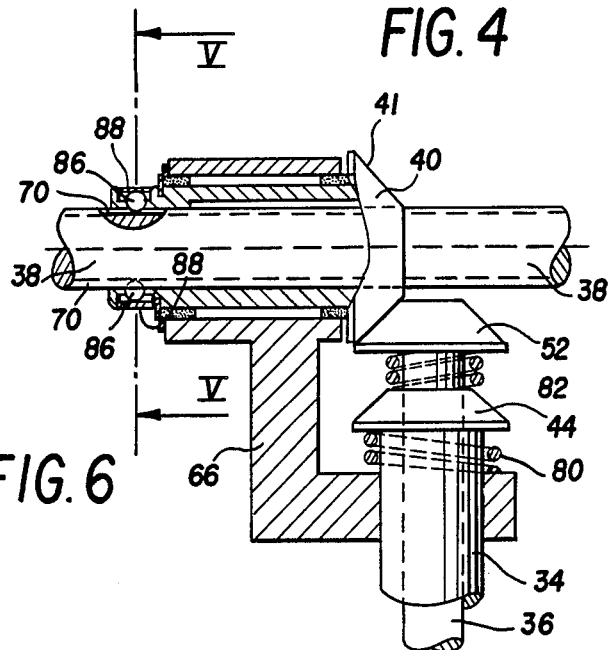
FIG. 4

STAGE FOR A MICROSCOPE

BACKGROUND OF THE INVENTION

This invention relates to a stage for a microscope. More particularly, the invention relates to a stage for a microscope comprising a stage carrier, an object stage, and an intermediate carrier disposed between the stage carrier and the object stage, in which the intermediate carrier and the object stage are displaceable respectively in first and second directions.

This type of stage carrier may also be displaceable in a third direction in space perpendicular both to the first and second directions, relative to a microscope objective.

In known microscopes a first setting mechanism is provided for movement of the intermediate carrier in the first direction, and a second setting mechanism is provided for movement of the object stage in the second direction. A third setting mechanism can be provided for movement of the object stage in the third direction.

The arrangement is such that upon actuation of the first setting mechanism for moving the intermediate carrier in the first direction the object stage, the intermediate carrier, and the first and second setting mechanisms are all moved in the first direction.

This entrainment of the second setting mechanism with the first setting mechanism is disadvantageous, because as a result of the second setting mechanism being entrained the precise position of this second setting mechanism cannot immediately be determined at any time. The operability of microscopes of such a kind is impaired as a result of this. A further defect of these microscopes consists in the low ergonometry, which is present only in a particular setting of the setting mechanisms, while all other settings of the setting mechanisms leave aspects to be desired with regard to ergonometry.

In the case of the application of such microscopes in the semiconductor industry, the object stages are constantly becoming larger: in order to be able to examine wafers having dimensions of 4×4 inches (100 mm×100 mm), 6×6 inches (150 mm×150 mm) and 8×8 inches (200 mm×200 mm) along their entire surface length, it is necessary to be able to adjust the object stage in the first and second directions by at least 4 inches (100 mm), 6 inches (150 mm) or 8 inches (200 mm). In known microscopes actuation of the first setting mechanism by, for example, 8 inches (200 mm) causes displacement of the second setting mechanism by 8 inches (200 mm). Thus, following displacement of the intermediate carrier and the object stage in the first direction the second setting mechanism must first be located; this can be very difficult when the operator is trying to view the object under examination at the same time as effecting the displacement.

The problem is even more acute when an uncoupling element is provided for uncoupling the two setting mechanisms so that rapid adjustment can be performed. Moreover, with the type of stage described above there is always a position of the object stage in which the hand of the operator can collide with the setting mechanism for the setting of the stage carrier in the third direction.

A second mechanism for the setting of the stage carrier and thus of the object stage in the third direction is described in our West German Patent Application Ser. No. P 35 23 756.2, the contents of which are incorporated herein by reference.

SUMMARY OF THE INVENTION

It is an object of the present invention to provide an improved stage for a microscope, more particularly a stage which is easy to operate and which can be adjusted in either the first or second direction without inconvenience.

According to the present invention there is provided a stage for a microscope comprising a stage carrier, an object stage, an intermediate carrier disposed between the stage carrier and the object stage, first displacement means adapted to displace the intermediate carrier in a first direction relative to the stage carrier, second displacement means adapted to displace the object stage in a second direction substantially transverse to the first direction, said first and second displacement means being fixed relative to the stage carrier.

As a result of the arrangement of the first and second displacement means so that they are fixed relative to the stage carrier, the advantage is achieved that the two displacement means remain in a fixed position independently of any selectable position of the object stage, so that an ergonomic arrangement of the two displacement means is possible.

In addition, a great deal of operating time is saved because the displacement means do not have to be located before they can be used.

Advantageously the second displacement means comprises a rotatable element fixed relative to the stage carrier, and an elongate member extending therethrough in a direction substantially parallel to the first direction, said elongate member being rotatable with the rotatable element.

Advantageously the first displacement means comprises first drive means, a first drive shaft fixed relative to the stage carrier and secured to the first drive means, and a first drive wheel which engages the intermediate carrier.

Preferably the first drive wheel is rotatably driven through the first drive means and the first drive shaft, and rotation of the first drive wheel causes movement of the intermediate carrier in the first direction.

Desirably the second displacement means further comprises second drive means, a second drive shaft fixed relative to the stage carrier and secured to the second drive means, and a second drive wheel which engages the rotatable element.

Preferably the second drive wheel is rotatably driven through the second drive means and the second drive shaft, and rotation of the second drive wheel causes rotation of the rotatable element.

Preferably the elongate member is provided with a third drive wheel which engages the object stage, so that rotation of the elongate member causes movement in the second direction; preferably also the elongate member is slidable through the rotatable element upon displacement of the intermediate carrier in the first direction. This enables the rotatable element to remain in a position fixed relative to the stage carrier during displacement of the intermediate carrier in the first direction.

The rotatable element may be provided with a central aperture through which the elongate member extends, and the cross-sectional shape of the central aperture may be substantially the same as the cross-sectional shape of the elongate member. At least part of the crosssection of the aperture of the rotatable element may be non-circular to facilitate rotation of the elongate member with the rotatable element.

As a result of this it is possible to transmit from the rotatable element to the elongate member a turning moment which is further transmitted by the elongate member to the third drive wheel. The elongate member can have a many-sided cross-section, or a circular cross-section with at least one axial longitudinal groove in which a spring or ball is provided.

The first drive means and the second drive means may be disposed concentrically with respect to one another, and the first and second drive means may be juxtaposed at one end of the first and second drive shafts.

The concentric construction of the two drive shafts provides not only a simple bearing of the two, but also the possibility of disposing the drive means of the first and second displacement means adjacent to one another, so that the two drive means can be simply actuated at a common location.

Conveniently the first and second drive means each comprises a handwheel rotatable about an axis substantially transverse to the first and second directions.

The handwheels may be disposed on a centroidal axis of the stage carrier.

Preferably uncoupling means is provided for uncoupling the first displacement means from the intermediate carrier and for uncoupling the second displacement means from the object stage, whereby the intermediate carrier and the object stage can be displaced rapidly independently of the first and second displacement means. This is particularly useful in microscopes having an object stage of large dimensions, such as microscopes used in the semiconductor industry.

The first and second drive means can comprise, for example, manually operable milled heads, or electric motors. The drive wehels can be constructed as toothed wheels or as friction wheels. Cooperating formations can be provided on the intermediate carrier and on the object stage for engaging with the respective drive wheel. The cooperating formations can be toothed racks or friction surfaces. When the drive wheels and cooperating formations are constructed with teeth there is the advantage that they mesh without slip, so that the setting of the object stage in the first and/or second direction is possible with easy action and with accuracy. The rotatable element may also be provided with a cooperating formation which cooperates with the second drive wheel; the rotatable element and the second drive wheel may be, for example, constructed as bevel gears, so that the elongate member is not prevented from extending through the rotatable element.

Third displacement means may be provided for displacing the stage carrier in a third direction substantially transverse to the first and second directions; the third displacement means may be provided with third drive means, for example, a handwheel which may be provided with a milled head. It is particularly advantageous for the third displacement means to be disposed in the vicinity of the first and second drive means so that the hand of an operator describes an arcuate movement between the first and second drive means and the third drive means about the elbow or the resting place of the forearm on the work table. In this manner, an optimal ergonometry is achieved with regard to the operation of the first, second and third displacement means.

The vertical arrangement of the first and second drive means in the vicinity of the centroidal axis of the stage enables the first and second displacement means and the third displacement means to be disposed in an optimal manner in relation to one another as regards ergonomics.

It is of course also possible to dispose the first and second drive means together with the first and second drive shafts horizontally in the first direction. Similarly, it is possible that the first and second drive shafts are not disposed concentrically but alongside one another in a parallel configuration.

The stage according to the invention can be used in both upright and inverted microscopes.

BRIEF DESCRIPTION OF THE DRAWINGS

Reference is now made to the accompanying drawings, in which:

FIG. 4 is a section along the line IV—IV of FIG. 3;

FIG. 5 is a section along the line V—V of FIG. 4;

FIGS. 6 and 7 are cross-sectional views of alternative embodiments of displacement means.

DESCRIPTION OF THE PREFERRED EMBODIMENTS

Figure 1:
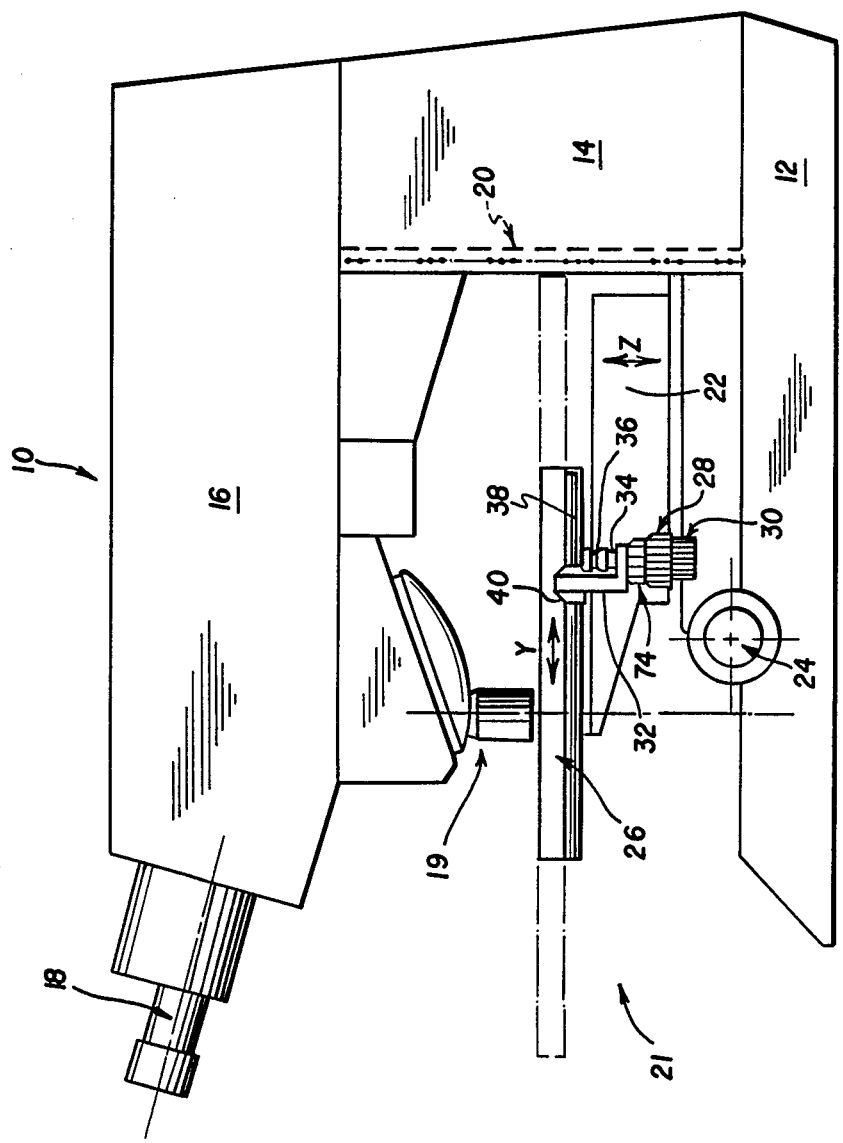
FIG. 1 is a side elevation of a stage for a microscope according to the invention.
Figure 2:
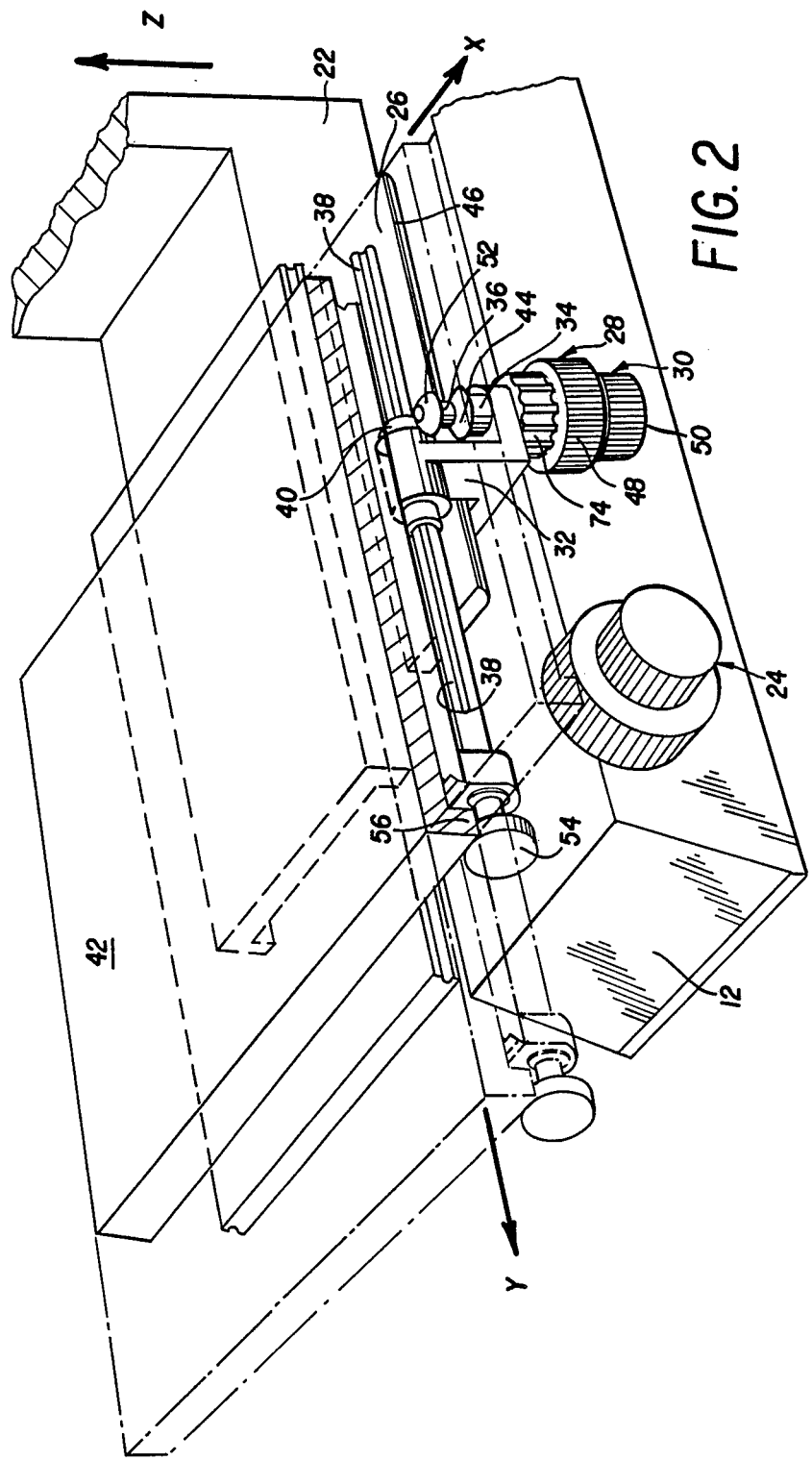
FIG. 2 is a perspective view of a stage for a microscope according to the invention with part cut away.
Figure 3:
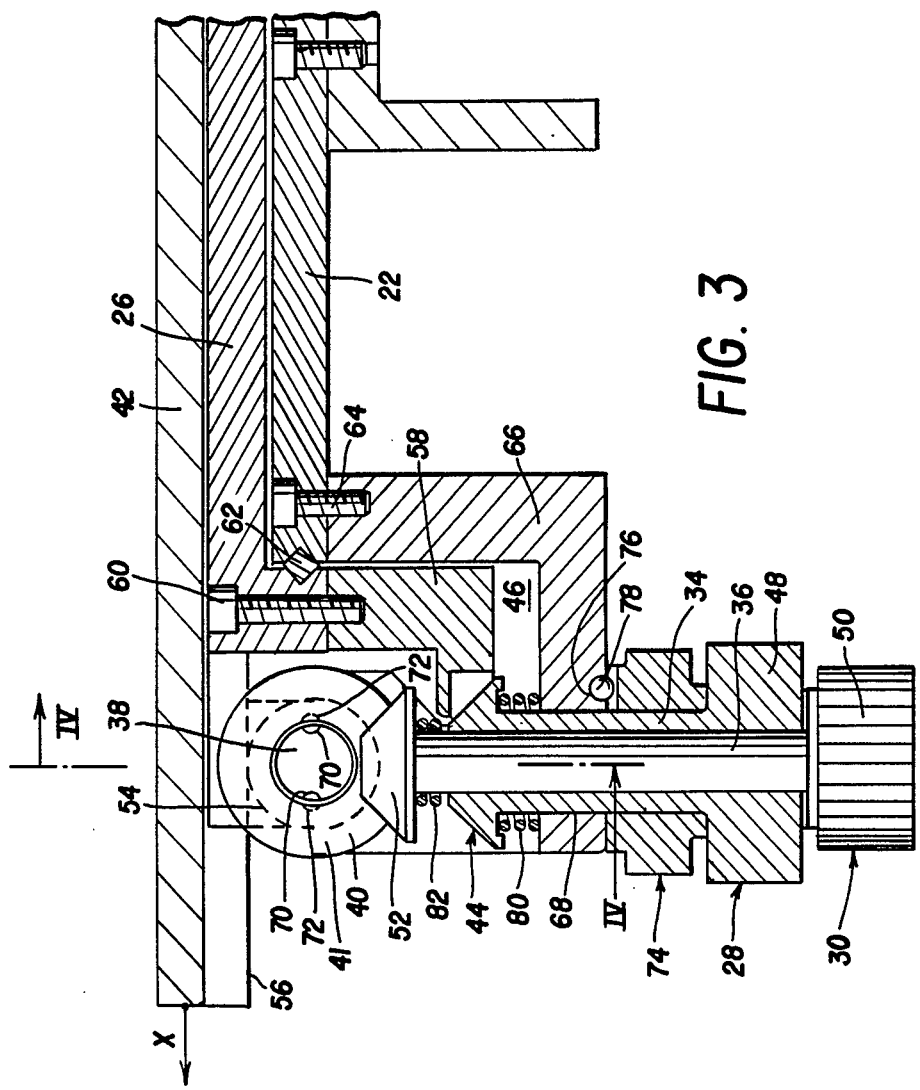
FIG. 3 is a section through displacement means of a stage for a microscope according to the invention.

In FIGS. 1 and 2 an upright microscope 10 is provided with a base 12, a vertical support 14 and a cross beam 16 supported by the support 14; the cross beam 16 is provided with an eyepiece arrangement 18. An objective 19 is disposed underneath the cross beam 16.

The microscope 10 is provided with a stage 21 which comprises a stage carrier 22, an intermediate carrier 26 disposed on the stage carrier, and an object stage 42 disposed on the intermediate carrier (the object stage 42 is not visible in FIG. 1). The intermediate carrier 26 is provided with first displacement means in the form of a setting mechanism 28 for displacing the intermediate carrier in a first direction indicated by arrows y. The object stage 42 is provided with second displacement means in the form of a setting mechanism 30 for displacing the object stage 42 in a second direction indicated by arrows x (see FIG. 2)—the second direction is perpendicular to the plane of FIG. 1. The setting mechanism 30 is coaxial with the setting mechanism 28. The directions x and y are substantially transverse to one another.

The vertical support 14 is provided with a vertical guide 20, along which the stage 21 is adjustable in a third direction indicted by arrow z. Third displacement means in the form of a setting mechanism 24 is provided for displacing the stage 21 in the third direction, and is disposed in the region of the base plate 12. The setting mechanism 24 is described in more detail in the West German Patent Application referred to above.

In FIG. 1 the leftmost and rightmost displacement of the intermediate carrier 26 relative to the stage carrier 22 are indicated using dot-dash lines.

The setting mechanism 28 comprises first drive means in the form of a first handwheel 48, a first drive shaft 34 and a frusto-conical first drive wheel 44 disposed at the end of the first drive shaft 34 remote from the handwheel 48; the first drive wheel 44 is a bevel gear. The first drive wheel 44 engages an elongate first cooperating formation 46 which is provided on the intermediate carrier 26 and which extends in the first direction. The first drive shaft 34 is secured to the handwheel 48, and the first drive wheel 44 is secured to the drive shaft 34, so that rotation of the handwheel 48 causes rotation of the first drive wheel 44.

The first drive wheel 44 engages the first cooperating formation 46 such that frictional forces cause the first cooperating formation 46, together with the intermediate carrier 26, to move in the first direction when the first drive wheel 44 rotates. The object stage 42, which is mounted on the intermediate carrier 26, simultaneously moves in the first direction.

The setting mechanism 30 comprises second drive means in the form of a second handwheel 50, a second drive shaft 36 and a frusto-conical second drive wheel 52 disposed at the end of the second drive shaft 36 remote from the handwheel 50. The second drive shaft 36 is secured to the handwheel 50 and the second drive wheel 52 is secured to the second drive shaft 36, so that rotation of the handwheel 50 causes rotation of the second drive wheel 52.

The setting mechanism 30 also includes a rotatable element 40, fixed relative to the stage carrier 22, and an elongate member 38. The elongate member 38 extends through the rotatable element 40 in a direction substantially parallel to the first direction and is movable in the first direction relative to the rotatable element 40. An end of the elongate member 38 is provided with a third drive wheel 54 which engages an elongate third cooperating formation 56 provided on the object stage 42. The third cooperating formation 56 extends substantially parallel to the second direction.

The third drive wheel 54 engages the third cooperating formation 56 such that frictional forces cause the third cooperating formation 56, together with the object stage 42, to move in the second direction when the third drive wheel 54 rotates.

The rotatable element 40 includes a conical friction wheel 41 which engages the second drive wheel 52 so that frictional forces cause the rotatable element 40 to rotate when the second drive wheel 52 rotates. The friction wheel 41 acts as a second cooperating formation which is engaged by the second drive wheel 52.

The elongate member 38 is secured to the rotatable element 40 in such a manner that it rotates when the rotatable element 40 rotates. Thus rotation of the handwheel 50 causes rotation of the third drive wheel 54 thereby displacing the object stage 42 in the second direction. In FIG. 2 an end position of the object stage 42 is shown.

During movement in the first direction, the elongate member 38 slides through the rotatable element 40 which remains fixed to the stage carrier 22.

The first and second drive shafts 36 and 34 are disposed coaxially with the second drive shaft 36 within the first drive shaft 34, and the second drive shaft 36 projects beyond the first drive shaft 34. The handwheels 48 and 50 are juxtaposed at an end of said first and second drive shafts 34 and 36 remote from the drive wheels 52 and 44.

A bearing arm 32 is fixedly secured to the stage carrier 22, and the setting mechanism 28 and 30 are rotatably mounted to the bearing arm; thus the bearing arm 32 secures the setting mechanisms 28 and 30 relative to the stage carrier 22.

The setting mechanism 28 and 30 are shown in more detail in FIGS. 3 to 7.

The cooperating formation 46 is secured to the intermediate carrier 26 by means of an arm 58. The arm 58 is secured to the intermediate carrier 26 by bolts 60.

The displacement of the intermediate carrier 26 is guided in the first direction by a roller guide which includes a roller 62 disposed between the intermediate carrier 26 and the stage carrier 22.

The stage carrier 22 is fixedly secured to an arm 66 by means of bolts 64; the arm 66 forms part of the bearing arm 32. The arm 66 is provided with a bore 68 through which the first and second drive shafts 34 and 36 extend rotatably.

Although the elongate member 38 is slidable with respect to the rotatable element 40, it is secured to the rotatable element 40 in such a manner that turning moment between the two is preserved in any selectable position of the object stage 42. This can be achieved as shown in FIG. 5 in which two axially extending recesses 70 are provided in an aperture 71 of the rotatable element 40 and two axially extending recesses 72 are provided in the elongate member 38. The recesses 70 and 72 are aligned and balls 86 are disposed in the recesses; this provides a connection which preserves turning moment between the rotatable element 40 and the elongate member 38, but does not prevent axial relative movement.

A spring clamp 88 is secured to the rotatable element 40 by means of a screw element 90 and serves to retain the balls 86 captive in the recesses 70 and 72.

In FIG. 6 another embodiment of means to preserve the turning moment between the rotatable element 40 and the elongate member 3 is shown. The elongate member is designated 38' has a square cross-section, and the rotatable element, which is designated 40', is provided with a central aperture 71' which is also of square crosssection; the aperture 71' is a close fit with the elongate member 38'.

In FIG. 7 a further embodiment is shown. The elongate member is designated 38" and the rotatable element is designated 40". The elongate member 38" is provided with an axially extending groove 70" in which a spring 92 is disposed. The rotatable element 40" has a central aperture 71" having an axially extending recess 72" which is aligned with the groove 70"; the spring 92 is also disposed in the recess 72".

Uncoupling means 74 is provided to uncouple the second drive wheel 52 from the rotatable element 40, and to uncouple the first drive wheel 44 from the first cooperating formation 46. The uncoupling means 74 enables the object stage 42 to be rapidly moved in the first and second directions.

Mechanically prestressed compression springs 80 are provided between the first drive wheel 44 and the arm 66, and mechanically prestressed compression springs 82 are provided between the second drive wheel 52 and the first drive wheel 44. A ball 78 is disposed in a recess 76 of the arm 66. Rotation of the uncoupling means 74 causes the ball 78 to be forced out of the recess 76 which causes displacement of the first and second drive shafts 34 and 36 downwardly to move the first and second drive wheels 44 and 52 out of engagement respectively with the first and second cooperating formations 46 and 41.

The uncoupling means 74 can be further rotated so that the ball 78 is urged into recess 76 which again engages the first and second drive wheels 44 and 52 with the first and second cooperating formations 46 and 41, so that displacement can be achieved using the setting mechanisms 28 and 30.

Figure 8:
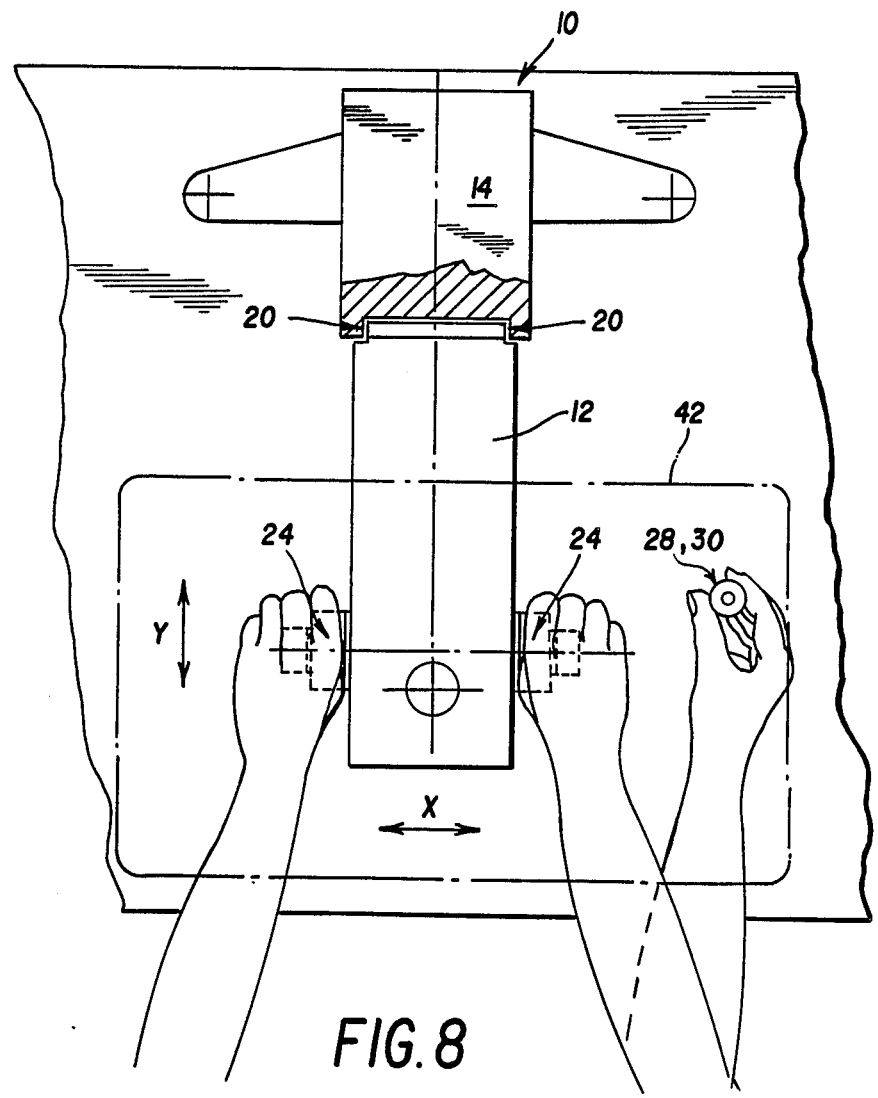
FIG. 8 is a plan view of a section of a stage for a microscope according to the invention.

FIG. 8 shows a plan view of the microscope 10. The object stage 42 is guided in vertical guides 20 in the third direction which is transverse to the plane of FIG. 8. It can be seen from FIG. 8 that the setting mechanism 24 is provided on each side of the base 12. It is clear from FIG. 8 that there is good ergonometry and operating capability and that the setting mechanisms 28, 30 and 24 can all be easily used. The arrangement is particularly suitable for objectives of large dimensions such as are required for the examination of semi-conductor wafers.

It will be appreciated that the first, second and third drive wheels 44, 52 and 54 can be constructed as toothed bevel gears, in which case the first and third cooperating formations 46 and 56 can be toothed racks and the second cooperating formation 41 can be a toothed bevel gear. Moreover the second drive wheel 52 and the second cooperating formation 41 can be a worm and worm gear.

We claim:

1. A stage for a microscope comprising a stage carrier, an object stage, an intermediate carrier disposed between the stage carrier and the object stage, first displacement means adapted to displace the intermediate carrier in a first direction relative to the stage carrier, second displacement means adapted to displace the object stage in a second direction substantially transverse to the first direction, said first and second displacement means being fixed relative to the stage carrier.

2. A stage according to claim 1, in which the second displacement means comprises a rotatable element fixed relative to the stage carrier, and an elongate member extending therethrough in a direction substantially parallel to the first direction, said elongate member being rotatable with the rotatable element.

3. A stage according to claim 2, wherein the elongate member is provided with a third drive wheel which engages the object stage, so that rotation of the elongate member causes movement in the second direction, and the elongate member is slidable through the rotatable element upon displacement of the intermediate carrier in the first direction.

4. A stage according to claim 3, wherein the rotatable element is provided with a central aperture through which the elongate member extends, and the cross-sectional shape of the central aperture is substantially the same as the cross-sectional shape of the elongate member.

5. A stage according to claim 4, wherein at least part of the cross-section of the aperture of the elongate member is non-circular to facilitate rotation of the elongate member with the rotatable element.

6. A stage according to claim 1, wherein the first displacement means comprises first drive means, a first drive shaft fixed relative to the stage carrier and secured to the first drive means, and a first drive wheel which engages the intermediate carrier.

7. A stage according to claim 6, wherein the first drive wheel is rotatable driven through the first drive means and the first drive shaft, and rotation of the first drive wheel causes movement of the intermediate carrier in the first direction.

8. A stage according to claim 6, wherein the second displacement means further comprises second drive means, a second drive shaft fixed relative to the stage carrier and secured to the second drive means, and a second drive wheel which engages the rotatable element.

9. A stage according to claim 8, wherein the second drive wheel is rotatably driven through the second drive means and the second drive shaft, and rotation of the second drive wheel causes rotation of the rotatable element.

10. A stage according to claim 9, wherein the first drive means and the second drive means are disposed concentrically with respect to one another, and the first and second drive means are juxtaposed at one end of the first and second drive shafts.

11. A stage according to claim 9, wherein the first and second drive means each comprises a handwheel rotatable about an axis substantially transverse to the first and second directions.

12. A stage according to claim 11, wherein the handwheels are disposed in the vicinity of a centroidal axis of the stage carrier.

13. A stage according to claim 1, in which uncoupling means is provided for uncoupling the first displacement means from the intermediate carrier and for uncoupling the second displacement means from the object stage, whereby the intermediate carrier and the object stage can be displaced rapidly independently of the first and second displacement means.

* * * * *